April 28, 1931.  A. R. KEMP  1,802,605
METHOD AND MACHINE FOR INSULATING CABLES
Filed May 18, 1927
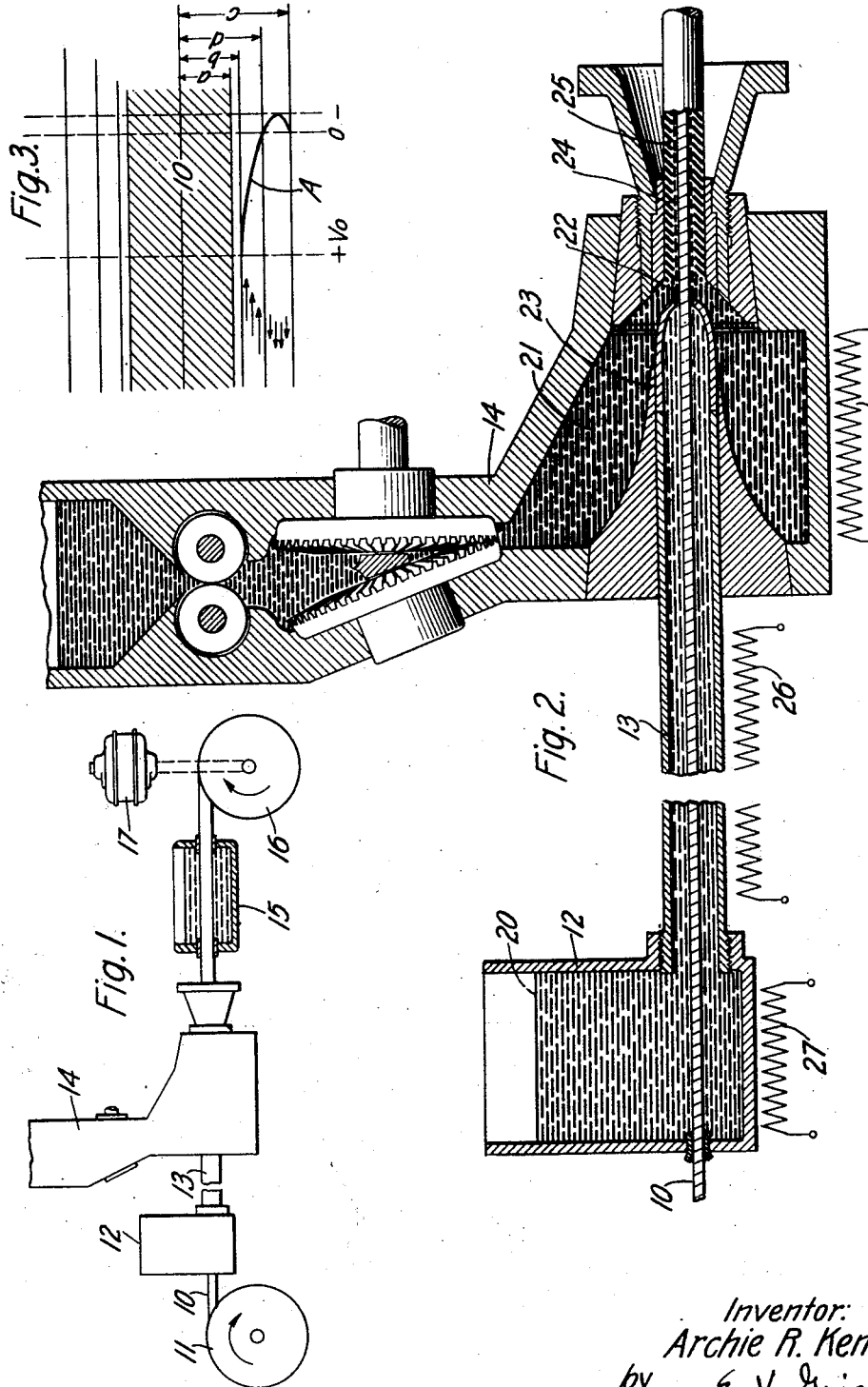
Inventor:
Archie R. Kemp
by  E. V. Griggs
Attorney Patented Apr. 28, 1931

1,802,605

UNITED STATES PATENT OFFICE

ARCHIE R. KEMP, OF WESTWOOD, NEW JERSEY, ASSIGNOR TO BELL TELEPHONE LABORATORIES, INCORPORATED, OF NEW YORK, N. Y., A CORPORATION OF NEW YORK

METHOD AND MACHINE FOR INSULATING CABLES

Application filed May 18, 1927. Serial No. 192,351.

This invention relates to cable making, and more particularly to methods and machines for manufacturing submarine cables in which continuous loading material is employed which has properties which vary with strain, the loading layer being protected from strain by being separated from the surrounding insulation by a layer of viscous material.

A type of submarine cable to the manufacture of which this invention is particularly applicable is disclosed in a copending application of A. R. Kemp, Serial No. 617,511, filed February 7, 1923, and issued as Patent No. 1,700,766 on February 5, 1929. The compound therein disclosed for separating the loading layer from the surrounding insulation is preferably a liquid bitumen of viscous nature. In the copending application of G. A. Anderegg, Serial No. 734,201, filed August 26, 1924, and issued as Patent No. 1,681,566 on August 21, 1928, the layer of viscous material is applied under pressure as the conductor passes into the extrusion chamber of the covering machine.

An object of the present invention is to provide an improved method and simple means for developing the necessary pressure in the viscous material as it enters the extrusion chamber.

In an arrangement which embodies the invention and is merely illustrative thereof, a continuously loaded conductor, which has previously been impregnated with viscous material to fill all the interstices between the strands of the conductor, is passed through a chamber containing additional viscous material or pressure equalizing material under atmospheric pressure and also through a long tubular channel which is connected to and opens into the material chamber. The other end of the tubular channel, having an orifice of smaller diameter, leads into an extruding chamber where the outer covering of gutta percha or less plastic insulating material, such as a rubber compound, is applied. The outer covering of insulating material is applied under an extremely high pressure and the pressure equalizing material is prevented from being displaced by this pressure by building up the pressure applied to the pressure equalizing material at the orifice of the tubular channel, so as to neutralize the pressure in the extruding chamber and control the inner dimension of the outer layer of heavy insulating covering. This counteracting pressure is determined by and is proportional to the length of the tubular channel, the viscosity of the pressure equalizing material flowing in the channel, the velocity of the conductor through the channel, and the diameter of the conductor and channel.

A feature of the invention is the centering of the conductor in the tubular channel with respect to the surrounding layer of pressure equalizing material while the conductor is moving through the insulating machine. This is accomplished by the uniformly convergent pressure exerted by the viscous pressure equalizing material on the surface of the conductor as it moves through the tubular channel so that the conductor is maintained in a central position with respect to the diameter of the tubular channel orifice in the extrusion chamber and a uniform thickness of pressure equalizing material is applied to the conductor throughout its entire length.

The invention is also suitable in connection with the impregnation or saturation with insulating and protective compounds of tire cords, fabrics, braids or servings on wires, and the like. A particular use to which the process of this invention is applicable is the impregnation of cotton or silk covered wire. A more viscous and otherwise a more suitable compound for the purpose of increasing the wearing and insulating properties of the wire may thus be used than is otherwise possible.

A more detailed description of the invention follows and is illustrated in the accompanying drawing.

Fig. 1 shows schematically the mechanism employed in this invention;

Fig. 2 is an enlarged view in cross-section, showing in detail how the viscous material chamber and the extrusion chamber are coupled together by a long tubular channel, and Fig. 3 is an enlarged view of a section of tubular channel illustrating the flow of viscous material therein.

Referring to the drawing, Fig. 1 shows a covering machine in accordance with this invention, for applying a layer of semi-fluid material on a conductor and a layer of heavy plastic material over the layer of semi-fluid material in a continuous process. The conductor 10, such as a central conductor having a continuously spiralled tape or wire thereabout of loading material, is supplied from a reel 11 and passes through an open reservoir 12. The conductor is preferably impregnated with semi-fluid insulating material in a vacuum, prior to applying the pressure equalizing layer and in accordance with the process disclosed in the Anderegg application hereinbefore-mentioned, to completely fill all the interstices between the loading tape and the central conductor. A long tubular member or friction tube 13, such as a pipe, forms a connecting channel between the reservoir 12 and the extrusion chamber 14. In the extrusion chamber 14 a layer of heavy plastic material is applied over the flux layer under high pressure. The insulated conductor is passed through a cooling bath 15 to set the insulation. The conductor is wound on a take-up reel 16 which is rotated by a motor 17 to draw the conductor at a suitable velocity through the reservoir, tubular member, chamber and cooling bath.

Referring to Fig. 2, the reservoir 12 contains a semi-fluid viscous material 20 under atmospheric pressure, and the extrusion chamber 14 contains the heavy plastic insulation 21, such as gutta percha or rubber, under high pressure. The tubular channel 13 connecting the reservoir to the extrusion chamber is so designed that a sufficient pressure may be developed at the orifice 22, formed by the tapered core tube 23 projecting into the extrusion chamber, to force a sufficiently thick layer 24 of pressure equalizing material through the core tube orifice and underneath the layer 25 of heavy plastic insulation. The pressure developed at the orifice of the core tube 23 is due entirely to the viscous resistance of the pressure equalizing material to the movement of the conductor through the tubular channel 13. The viscosity of the pressure equalizing material is regulated by a resistance heater 26 shown diagrammatically in the drawing but which may consist of any suitable heater arrangement surrounding the tubular channel. The viscous material in the reservoir 12 is maintained at a desired temperature by a heater 27, and the plastic insulation in the extrusion chamber 14 is also maintained at a desired temperature by the heater 28.

Since the pressure exerted on the heavy plastic insulation in the extrusion chamber is extremely high in order to force a continuous and uniform layer or covering of insulation on the traveling conductor, it is evident that an equal or greater pressure must be developed in the semi-fluid pressure equalizing material to counteract the high pressure of the plastic insulation. Otherwise the plastic insulation would perform a wiping action on the semi-fluid layer after it leaves the core tube orifice and prevent a sufficiently thick layer of viscous material being applied to the conductor.

In order to explain the development of this pressure at the core tube orifice, an approximate analysis of the movement of the viscous material will now be given. The viscous material in the tubular channel may be considered as being made up of cylindrical layers of differential thickness. The innermost layer may be considered to move with the velocity of the conductor on the assumption that there is no slipping at the metallic surface. Since the orifice of the core tube 23 is much smaller in diameter than the tubular channel 13, the whole tube of viscous material contained in the tubular channel cannot move with the velocity of the conductor, and therefore, neighboring layers must slip on one another. The velocity of the successive layers will decrease from the conductor out along any radius. But as only the innermost layers can enter the extrusion chamber, the next innermost layer will be turned at the core tube orifice and will flow back toward the reservoir along the outer part of the space within the tubular channel. It is therefore evident that there are two régimes of flow within the tubular channel.

Referring to Fig. 3 the center of the tubular channel 13 is occupied by the conductor 10 of the diameter $2a$.

The layers extending from here out to some boundary radius $d$ move in the direction of the conductor with a velocity varying from that of the conductor at $a$ to zero at $d$. The layers extending from the radius $d$ to that of the inside of the tubular channel $c$ move in the opposite direction with a velocity varying from zero at $d$, through a maximum, to zero again at $c$, as there can, from the usual hypothesis, be no slipping on the inside surface of the tubular channel. If the radius of the orifice of core tube 23 is $b$, the layers from $r=a$ to $r=b$ pass through this orifice into the head, the layers from $r=b$ to $r=d$ must be turned at the head and flow back in the space between $r=d$ and $r=c$. Hence the volume flowing per unit time in the annular space from $r=b$ to $r=d$ must equal that flowing per unit time in the annular space from $r=d$ to $r=c$.

That the reversal in the direction of the flow described above takes place was observed in an actual experiment in which the circulation in the reservoir indicated that the semi-fluid viscous material was flowing into the tubular channel near the center and out near the circumference. The reversal presumably takes place largely in the core tube, but there is probably a component of motion perpendicular to the axis of the tubular channel throughout a considerable distance. The temperature of the semi-fluid viscous material in the tubular channel is a factor in determining the pressure which can be built up at the core tube orifice. While the reservoir may be maintained at room temperature, the temperature of the viscous material in the core tube in actual practice is approximately 100° C. The coefficient of internal friction varies exponentially with the temperature, and hence the resistance to flow varies enormously with temperature. As the heat conductivity of the semi-fluid viscous material is low, it is probable that, except in the core tube, the temperature varies little from that of the reservoir. In the core tube 23 the resistance will be much lower, and this will probably tend to concentrate here the region of reversal.

In view of these considerations an approximation to an expression for the pressure can be obtained on the assumption that it will equal that developed by straight line motion parallel to the axis of the tubular channel.

In deducing this relation, the following symbols will be employed $a$ = radius of conductor.
$b$ = radius of core tube orifice.
$c$ = inner radius of tubular channel.
$L$ = length of tubular channel.
$P$ = pressure difference between head and reservoir.
$\mu$ = viscosity of pressure equalizing material.
$v_0$ = velocity of conductor.

Let velocities and distances be taken as positive in the direction from the reservoir toward the head. Then the pressure gradient $P$ will be negative. On the basis of the assumption made the conditions are those of viscous flow through a uniform circular section, for which the velocity ($v$) at any cylindrical layer of radius ($r$) is given by $$v = -\frac{P}{4\mu L}r^2 + A \log r + B \quad \text{Eq. 1}$$

See page 578 of a book on "Hydrodynamics" by Horace Lamb, 4th edition, Cambridge, 1916.

In the above equation A and B are constants to be determined by the boundary conditions. In this case these are:

$v = 0$ when $r = c$,
$v = V_0$ when $r = a$.

Substituting these values in Eq. 1 and writing $-P$ for $P$ to agree with the convention adopted, there are obtained two equations from which A and B may be determined, giving finally:

$$v = \frac{P}{4\mu L}\left\{(c^2 - r^2) + \frac{\log \frac{r}{c}}{\log \frac{c}{a}}(c^2 - a^2)\right\} - \frac{\log \frac{r}{c}}{\log \frac{c}{a}}V_0 \quad \text{Eq. 2}$$

This is the precise equation for the type of flow assumed, and shows, when plotted, that the velocity varies from the positive value $v_0$ at $r = a$, through zero at some radius ($d$) to a negative maximum, and then increases to zero at $r = c$. The curve A shown in Fig. 3 is plotted for an actual case from values computed by means of Eq. 2.

The further condition is that the positive volume flowing per unit time from $r=b$ to $r=d$ equals the negative volume per unit time from $r = d$ to $r = c$. Therefore the algebraical summation of the volume flowing per unit time from $r = b$ to $r = c$ equals zero, or $$\int_b^c 2\Pi r v \, dr = 0$$

Hence $$\int_b^c r v \, dr = 0 \quad \text{Eq. 3}$$

Substituting in Eq. 3 the value of $v$ from Eq. 2 and integrating there is obtained:

$$\frac{P}{4\mu L}\left\{\frac{(c^2-b^2)^2}{4} + \frac{2b^2 \log \frac{c}{b} - (c^2-b^2)}{4 \log \frac{c}{a}}(c^2 - a^2)\right\} + \frac{2b^2 \log \frac{c}{b} - (c^2-b^2)}{4 \log \frac{c}{a}}v_0 = 0 \quad \text{Eq. 4}$$

Eq. 4 gives P in terms of known quantities, and may conveniently be written $$P = 4\mu L v_0 Q \quad \text{Eq. 5}$$

where Q is a function of $a$, $b$, and $c$, given by $$Q = \frac{(c^2-b^2) - 2b^2 \log \frac{c}{b}}{(c^2-b^2)^2 \log \frac{c}{a} - (c^2-a^2)\left(c^2-b^2 - 2b^2 \log \frac{c}{b}\right)} \quad \text{Eq. 6}$$

In obtaining numerical values from Equation 5 and 6 it should be noted that the logarithmic terms in Equation 6 are to the base $e$ ($\log_e x = 2.30259 \log_{10} x$). The dimensions of $Q$ are $L^{-2}$. It is therefore most convenient to express $a$, $b$, $c$ and $L$ in inches and $v_0$ in inches per second. Values of $\mu$ are commonly expressed in poises and then $P$ in pounds per square inch is given by $$P = 5.81 \times 10^{-5} \mu L v_0 Q \quad \text{Eq. 5A}$$

As, from the theory given above the velocity of the layers of viscous material passing through the orifice decreases from $v_0$ to some lower value as illustrated in Fig. 3, the average velocity is less than $v_0$ and hence the volume of flux per unit length will occupy an annular space quite a little smaller than that of the orifice. Hence the thickness of the layer of viscous material obtained should be less than the difference in radius of the conductor and the core tube orifice. This conclusion, however, is based on the assumption of the continuous straight line flow. Actually, if the pressure in the core tube is greater than the pressure in the extrusion chamber not only the layers from $r = a$ to $r = b$ will enter the core tube orifice, but some of the next innermost layers will turn into the orifice with them, thus increasing the volume of viscous material per unit length of conductor and the final thickness of the viscous material layer. If the pressure difference between the core tube and the insulation is sufficiently great, the thickness of the viscous material layer obtained may be as great as, or even greater than the difference in radius of the conductor and the core tube orifice. Due to the considerable resistance developed by such curvilinear flow, it is to be presumed that such variations in thickness will be small compared with corresponding pressure differences.

While the above discussion is qualitative, no effort having been made to analyze exactly the complex flow in the vicinity and through the core tube orifice, it is sufficient to show that the thickness of the pressure equalizing layer depends on the pressure in the core tube and that this pressure depends on the dimensions of the tubular channel and on other conditions as shown by Eqs. 5 and 6.

A typical example of the approximate pressure developed in a particular construction of the invention is given in Example I below, where the corresponding value of pressure was computed from the above Equations 5 and 6 in accordance with a practical set of conditions.

*Example I*

$L$ length of tubular channel = 5 ft. = 60 in.
$a$ radius of conductor = .100 in.
$b$ radius of core tube orifice = .108 in.
$c$ radius of tubular channel = $\frac{3}{16}$ in. = .1875 in.
$v_0$ velocity of conductor = 20 ft./min. = 4 in./sec.
$\mu$ viscosity of the pressure equalizing material in the core tube = 100 approx.

For these values of $a$, $b$ and $c$, from Equation 6, $Q = 120$.

These values give the pressure $$P = 5.81 \times 10^{-5} \times 100 \times 60 \times 4 \times 120 = 167 \text{ lbs./sq. in.}$$

The computed value of 167 lbs. per sq. in. is only approximate since the actual value could not be measured, but was thought, from other data, to be about 200 lbs. per sq. in. This is as good an agreement as could be obtained from the data, as there was no exact measurement of the temperature, and consequently only the order of magnitude of the coefficient of viscosity could be obtained.

The values of $L$ and $c$ $\left(5 \text{ ft.} \times \frac{3}{16} \text{ in.}\right)$ given in Example I represent the general order of magnitude of the dimensions of the tubular channel that will be desired in most actual cases. For higher pressures higher values of $Q$ and hence lower values of $c$ will be required. When the limits of these values are reached for a given set of conditions, the pressure can only be increased by using a longer tubular channel or preferably by increasing the viscosity of the pressure equalizing material.

In Example II following, the maximum and minimum limits are given for practical use and values have been assigned to the variables such that $c$ has the greatest value, which is 1.00 inch. Under these conditions the minimum pressure built up at the core tube orifice will be approximately 50 lbs./sq. in.

*Example II*

Minimum pressure $P = 50$ lbs./sq. in.
Maximum viscosity $\mu = 1000$ poises.
Maximum velocity $v_0 = 40 \times \frac{12}{60} = 8$ in./sec.
Maximum length of tubular channel $L = 10$ ft. = 120 in.

$$\text{Here } Q = \frac{50 \times 10^5}{5.81 \times 10^3 \times 8 \times 120} = .9$$

For, Maximum radius of conductor
$a = .110$ inch.
Maximum radius of core tube orifice
$b = .118$ inch from Equation 6.
Maximum radius of tubular channel
$c = 1$ inch.

It is understood that different values of pressure may be obtained by changing the values of variables in the above example.

For instance, if the pressure required in the core tube is known, the problem is simply to determine values of L and $c$. Values of $a$, $b$, $v_0$ and $\mu$ will all be fixed by the conditions of the problem. By selecting a reasonable value for L and substituting this in Equation 5 together with the given values for P, $\mu$ and $v_0$, the corresponding values of Q will be obtained and from that the values of $c$ from Equation 6.

It has been shown that the application of pressure equalizing material in the extrusion process depends on the development of pressure in the core tube by the viscous flow in opposite directions of the inner and outer layers of viscous material. It has also been shown that the thickness of the layer of viscous material obtained on the conductor will depend on the difference between this pressure and the pressure within the extrusion chamber and also that as long as the former pressure is greater than the latter the thickness will be very nearly the difference between the radius of the conductor and the core tube orifice, and will only vary slightly with the pressure.

While the description relates to a particular embodiment of an open reservoir, the invention is not limited to this particular arrangement since modifications may be made as to the means for supplying the semi-fluid viscous material to the long tubular channel. Furthermore, the structural features of the tubular channel or friction device may be modified to supply the necessary friction to the flowing viscous material and the invention is only limited within the scope of the appended claims.

What is claimed is:

1. The method of applying a layer of a relatively fluid compound and a heavy covering material to a conductor in a continuous operation, which method comprises passing the conductor through said compound under low pressure, drawing the compound and the conductor through a tubular channel to maintain said compound in contact with a long length of said conductor, thereby placing said compound under a high pressure within said channel, forming a layer of said compound about said conductor, applying the covering material under a high pressure to said layer, and regulating the pressure of said compound, to counteract the pressure exerted by said covering material.

2. The method of continuously applying a plurality of layers of insulating material to a conductor, which method comprises applying a semi-fluid insulating material to the conductor under low pressure, drawing said conductor and semi-fluid material to the plastic insulating material through a tubular channel, applying the outer covering of plastic insulating material under high pressure to said semi-fluid material, and regulating the viscosity of said semi-fluid material to build up a counteracting pressure, whereby the high pressure of said outer covering material is offset and the inner diameter of said covering material is uniform throughout its length and is determined by said layer of semi-fluid material.

3. The method of insulating a conductor with a substantial layer of semi-fluid viscous material surrounded by a layer of heavy plastic material in a continuous operation, according to which a continuous uniform pressure in the viscous material is produced by the movement of the conductor therethrough against the reaction of the stationary containing vessel for said viscous material, said pressure being sufficient to overcome the extrusion pressure on said plastic material to secure a desired uniform inner diameter on said layer of plastic material.

4. A covering machine comprising a vessel under atmospheric pressure for holding a supply of a semi-fluid viscous material to be coated on a conductor, an extrusion chamber for extruding insulating material under high pressure about the coated conductor, a long tubular channel connected between said vessel and chamber, means for drawing the conductor through said tubular channel and chamber, the travel of said conductor causing said semi-fluid material to flow in said tubular channel, said channel having a tapered portion in said chamber to restrict the flow of said semi-fluid material along with said conductor, and means for controlling the viscosity of said semi-fluid material, whereby sufficient pressure is applied to said semi-fluid material at the exit of said tapered portion to counteract the pressure exerted by said insulating material in said extrusion chamber, said pressure on said semi-fluid material being determined by the length and diameter of said tubular channel, the viscosity of said semi-fluid material, the diameter of said conductor, and the velocity of the conductor through said tubular channel.

5. A covering machine comprising a vessel for feeding a viscous material under atmospheric pressure, an extrusion chamber for extruding plastic material under applied pressure, a pipe connecting said vessel to said extrusion chamber, a tapered core tube at the extremity of said pipe having an orifice within said extrusion chamber, means for drawing a conductor through said pipe and chamber at a uniform rate, said conductor being of a diameter smaller than the diameter of said orifice, the movement of said conductor causing said viscous material to be carried from said vessel into said pipe, and means for controlling the viscosity of said viscous material in said pipe, the dimensions of said pipe, orifice and conductor being so proportioned and the velocity of said conductor and the viscosity of said material being so controlled that the pressure gradient of the viscous material in said pipe is increased toward said core tube orifice so that the pressure at said orifice is not substantially less than the pressure of the plastic material in said extrusion chamber, whereby a uniform layer of viscous material is applied to said conductor under said plastic material.

6. A covering machine comprising a vessel for holding a supply of a semi-fluid material under atmospheric pressure, an extrusion chamber for extruding insulating material under high pressure, a pipe connecting said vessel to said extrusion chamber, said pipe having a length not more than ten feet and an inner radius of not more than one inch, a tapered core tube in said extrusion chamber at the end of said pipe having an orifice of a radius of not more than .118 of an inch, means for drawing a conductor through said vessel, pipe and chamber at a velocity not greater than eight inches per second, said conductor having a radius of not more than .110 of an inch the semi-fluid material in said vessel flowing in said pipe along with said conductor, and means to maintain the viscosity of said material in said pipe at a value not exceeding 1000 poises, whereby a pressure not less than 50 lbs. per square inch is applied to said material at the orifice of said core tube, to counteract the pressure of said insulating material in said extrusion chamber.

7. A continuous method of placing an inner substantial layer of a semi-fluid viscous material on a conductor under another layer of plastic material, according to which the conductor is moved through a container for said viscous material and the flow, caused thereby, of said viscous material controlled so that a pressure is generated therein which is sufficient to secure the formation of a substantial layer on said conductor of said viscous material against the extrusion pressure on said plastic material.

8. A continuous method of placing a uniform substantial layer of a semi-fluid viscous material on a conductor under another layer of plastic material, according to which the conductor is moved through a container for said viscous material and the flow, caused thereby, of said viscous material controlled so that a pressure is generated therein which is sufficient to secure the formation of a substantial layer on said conductor of said viscous material against the extrusion pressure on said plastic material, and so that said pressure is in a stable equilibrium when said conductor is substantially concentric with said layer of viscous material at the point of formation thereof.

In witness whereof, I hereunto subscribe my name this 17th day of May, A. D. 1927.

ARCHIE R. KEMP.